United States Patent
Li et al.

(10) Patent No.: US 12,553,267 B2
(45) Date of Patent: Feb. 17, 2026

(54) SERVER AND TOOL-FREE LOCKING MECHANISM

(71) Applicant: SUZHOU METABRAIN INTELLIGENT TECHNOLOGY CO., LTD., Jiangsu (CN)

(72) Inventors: Xiaozheng Li, Jiangsu (CN); Xiuzhong Yin, Jiangsu (CN)

(73) Assignee: Suzhou Metabrain Intelligent Technology Co., Ltd., Jiangsu (CN)

( * ) Notice: Subject to any disclaimer, the term of this patent is extended or adjusted under 35 U.S.C. 154(b) by 75 days.

(21) Appl. No.: 18/697,059

(22) PCT Filed: Jun. 30, 2022

(86) PCT No.: PCT/CN2022/102617
§ 371 (c)(1),
(2) Date: Mar. 29, 2024

(87) PCT Pub. No.: WO2023/123953
PCT Pub. Date: Jul. 6, 2023

(65) Prior Publication Data
US 2024/0401382 A1    Dec. 5, 2024

(30) Foreign Application Priority Data
Dec. 28, 2021    (CN) .......................... 202111630008.2

(51) Int. Cl.
*E05C 1/04* (2006.01)
*E05C 1/00* (2006.01)
(Continued)

(52) U.S. Cl.
CPC ............... *E05C 1/04* (2013.01); *E05C 1/004* (2013.01); *G06F 1/185* (2013.01)

(58) Field of Classification Search
CPC ... E05C 1/04; E05C 1/004; E05C 1/00; G06F 1/185; Y10T 292/1028; Y10T 292/096;
(Continued)

(56) References Cited

U.S. PATENT DOCUMENTS 9,637,958 B2 * 5/2017 Vanderick ................. E05C 3/08
2015/0124393 A1   5/2015 Lin

FOREIGN PATENT DOCUMENTS

| CN | 201159992 Y | 12/2008 |
| CN | 107678509 A | 2/2018 |

(Continued)

OTHER PUBLICATIONS

Machine translation of CN 113835482 (Year: 2021).*
International Search Report and Written Opinion for International Application No. PCT/CN2022/102617 mailed Aug. 31, 2022, with English translation of Search Report.
(Continued)

*Primary Examiner* — Christine M Mills
*Assistant Examiner* — Yahya Sidky
(74) *Attorney, Agent, or Firm* — Merchant & Gould P.C.

(57) ABSTRACT

Provided are a server and a tool-free locking mechanism. The tool-free locking mechanism includes: a module tray and a limiting member, wherein mounting grooves for insertion of the module bodies are formed in the limiting member, and at least two mounting grooves are provided in parallel; and at least one movement locking member movably connected to the module tray, where the movement locking member is provided at an outer side between notches of the adjacent mounting grooves, the movement locking member includes a locking portion, and locking structures matching each other are provided between the module tray and an end of the movement locking member close to the module tray; and the locking structures lock the module tray and the movement locking member when the movement locking member moves towards the module tray (Continued)

and the locking portion abuts against outer sides of module bodies in the adjacent mounting grooves.

19 Claims, 3 Drawing Sheets

(51) Int. Cl.
*G06F 1/18* (2006.01)
*G06F 1/185* (2026.01)

(58) Field of Classification Search
CPC ......... Y10T 292/1014; Y10T 292/1015; E05B 65/46; E05B 65/462; E05B 65/466; E05B 65/468; E05B 65/5253; E05B 65/5261; E05B 73/0082; E05B 2073/0088
See application file for complete search history.

(56) References Cited

FOREIGN PATENT DOCUMENTS

| | | | | |
|---|---|---|---|---|
| CN | 111966172 A | | 11/2020 | |
| CN | 113534922 A | * | 10/2021 | ............. G06F 1/186 |
| CN | 113721721 A | | 11/2021 | |
| CN | 113721727 A | | 11/2021 | |
| CN | 113747730 A | | 12/2021 | |
| CN | 113835482 A | * | 12/2021 | ............. G06F 1/183 |
| CN | 114442754 A | | 5/2022 | |
| KR | 20160125701 A | * | 11/2016 | ............... E05B 5/00 |
| WO | 2021139048 A1 | | 7/2021 | |

OTHER PUBLICATIONS

Chinese Search Report received for CN Serial No. 2021116300082 on Jun. 6, 2023, 3 pgs.

* cited by examiner

SERVER AND TOOL-FREE LOCKING MECHANISM

CROSS-REFERENCE TO RELATED APPLICATION

The present application is a National Stage Application of PCT International Application No.: PCT/CN2022/102617 filed on Jun. 30, 2022, which claims priority to Chinese Patent Application 202111630008.2, filed in the China National Intellectual Property Administration on Dec. 28, 2022, the disclosure of which is incorporated herein by reference in its entirety.

TECHNICAL FIELD

The disclosure relates to the field of servers, and in particular to a tool-free locking mechanism. The disclosure further relates to a server having the tool-free locking mechanism.

BACKGROUND

Modules such as a network interface card of a server, which generally serves to connect network devices such as the server and a switch, are indispensable to the server. At present, the modules such as the network interface card of the server are usually locked and fixed in the server one by one, which results in high consumption of locking components and low assembly efficiency.

SUMMARY

One aspect of the disclosure provides a tool-free locking mechanism. The tool-free locking mechanism is configured to mount and fix module bodies, and includes: a module tray and a limiting member fixed to the module tray, where mounting grooves for insertion of the module bodies are formed in the limiting member, and at least two mounting grooves are provided in parallel; and
  at least one movement locking member movably connected to the module tray, where the at least one movement locking member is provided at an outer side between notches of adjacent mounting grooves of the at least two mounting grooves, the at least one movement locking member includes a locking portion, and locking structures matching each other are provided between the module tray and an end of the at least one movement locking member close to the module tray; and
  the locking structures lock the module tray and the at least one movement locking member when the at least one movement locking member moves towards the module tray and the locking portion abuts against outer sides of module bodies in the adjacent mounting grooves.

In some embodiments, the movement locking member includes a locking bottom plate and a four-link assembly, where
  the four-link assembly includes:
  a fixed shaft fixed to the module tray;
  a drive shaft fixed to the locking bottom plate;
  functional shafts, where a pair of functional shafts are arranged and both connected between the fixed shaft and the drive shaft;
  a first link, where two ends of the first link are hinged to the fixed shaft and the functional shafts respectively; and
  a second link, where two ends of the second link are hinged to the drive shaft and the functional shafts respectively; and
  the pair of functional shafts move away from each other to match the first link and the second link to form the locking portion when the locking bottom plate moves towards the module tray to drive the drive shaft to move towards the fixed shaft.

In some embodiments, each of the functional shafts is sleeved with a rubber sleeve. In some embodiments, an end of the locking bottom plate away from the module tray is provided with a handle.

In some embodiments, the locking structure includes a positioning protrusion arranged on the locking bottom plate, and a positioning hole provided on the module tray and matching the positioning protrusion.

In some embodiments, the positioning protrusion is a truncated cone-shaped protrusion.

In some embodiments, a guide assembly is arranged between the locking bottom plate and the module tray.

In some embodiments, the guide assembly includes a strip-shaped guide hole provided on the locking bottom plate, and a guide bolt fixed to the module tray.

In some embodiments, N mounting grooves are provided, N−1 groups of movement locking members are provided, and the locking bottom plates of adjacent movement locking members are fixedly connected into a whole by a connecting plate, where N is a positive integer greater than or equal to 3.

In some embodiments, the limiting member includes a pair of side slideways provided parallel to each other, and a middle slideway arranged between the pair of side slideways in parallel, where the mounting grooves are formed between the middle slideway and the side slideway, and the at least one movement locking member is provided corresponding to an end portion of the middle slideway.

Another aspect of the disclosure provides a server. The server includes module bodes and the tool-free locking mechanism above.

BRIEF DESCRIPTION OF THE DRAWINGS

In order to more clearly illustrate the technical solutions in the examples of the disclosure or in the prior art, the accompanying drawings required for the description of the examples or the prior art will be simply introduced below. Apparently, the accompanying drawings in the following description are merely embodiments of the disclosure. Those of ordinary skill in the art would further be able to derive other accompanying drawings from the accompanying drawings without making creative efforts.

DETAILED DESCRIPTION OF THE EMBODIMENTS

The technical solutions in the embodiments of the disclosure will be clearly and completely described below in combination with the accompanying drawings in the embodiments of the disclosure. Apparently, the embodiments described are merely some embodiments rather than all embodiments of the disclosure. On the basis of the embodiments in the disclosure, all other embodiments obtained by those of ordinary skill in the art without making creative efforts fall within the scope of protection of the disclosure.

In order to make those skilled in the art better understand the solution of the disclosure, the disclosure will be further illustrated in detail below in combination with the accompanying drawings and particular embodiments.

Figure 1:
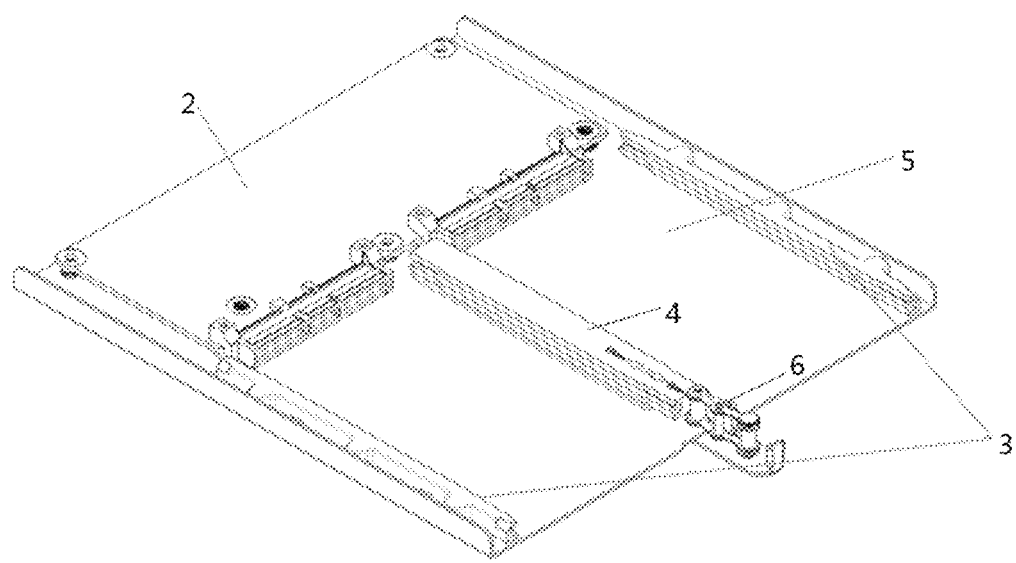
FIG. 1 is a schematic diagram of a tool-free locking mechanism according to an embodiment of the disclosure.
Figure 2:
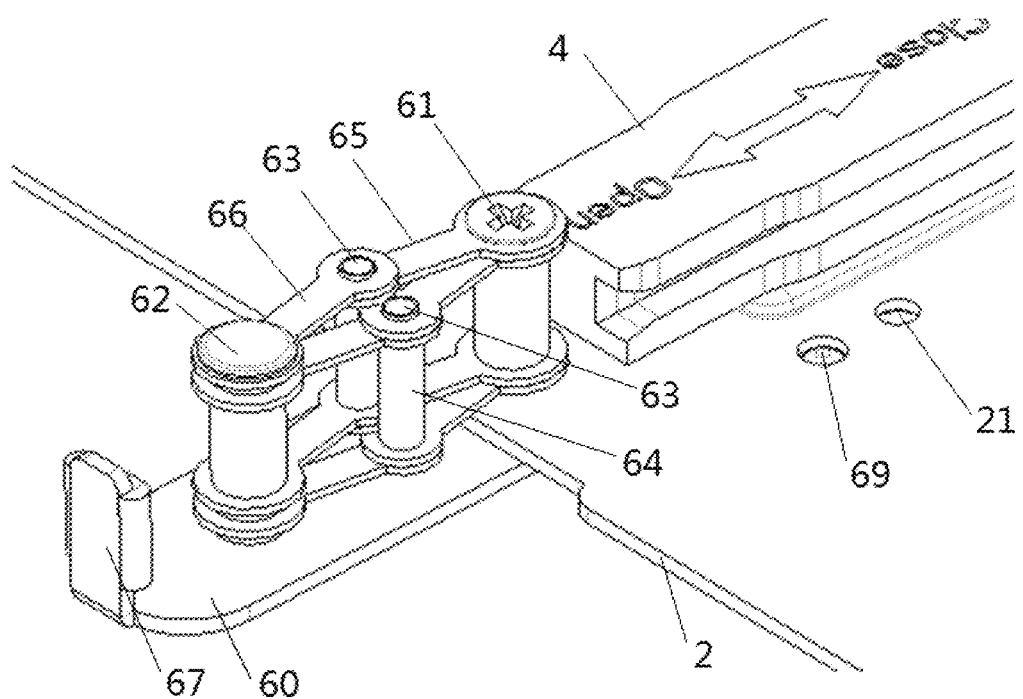
FIG. 2 is an enlarged view of a movement locking member in FIG. 1.
Figure 3:
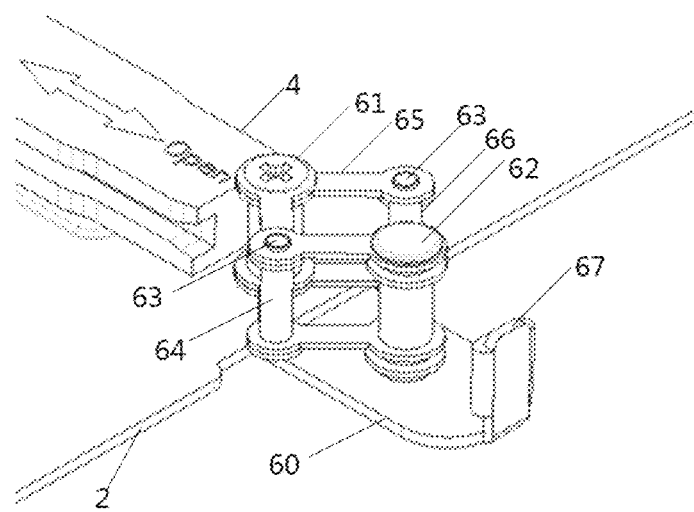
FIG. 3 is a schematic diagram of a movement locking member in a locked state.
Figure 4:
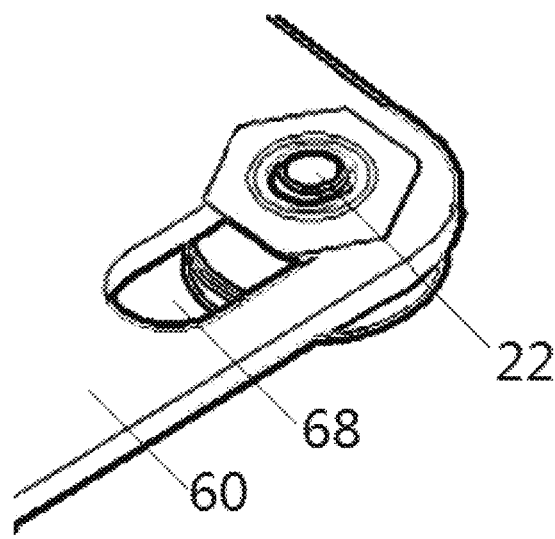
FIG. 4 is a partial enlarged view of a guide assembly.
Figure 5:
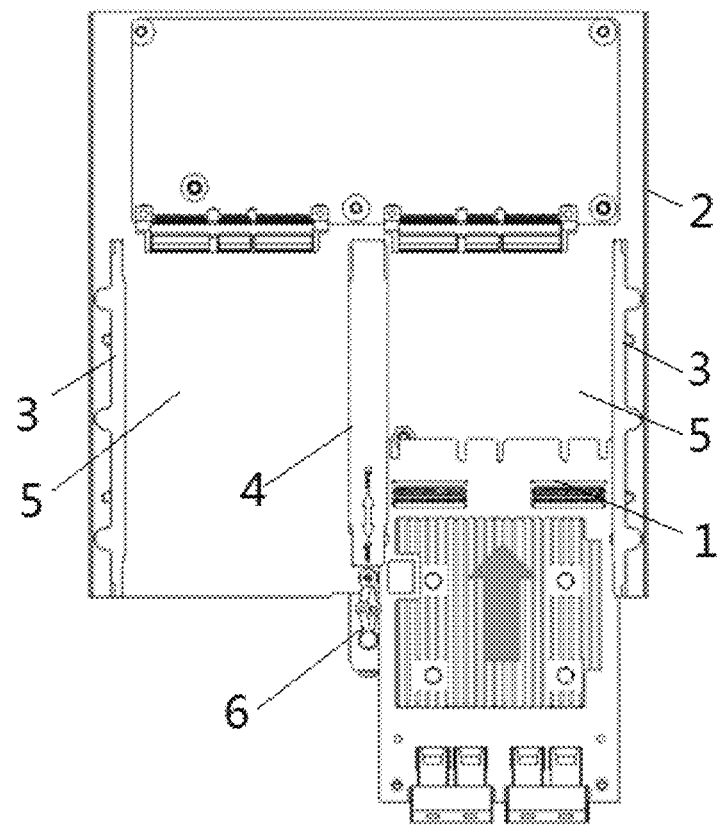
FIG. 5 is a schematic diagram of mounting of a module body.
Figure 6:
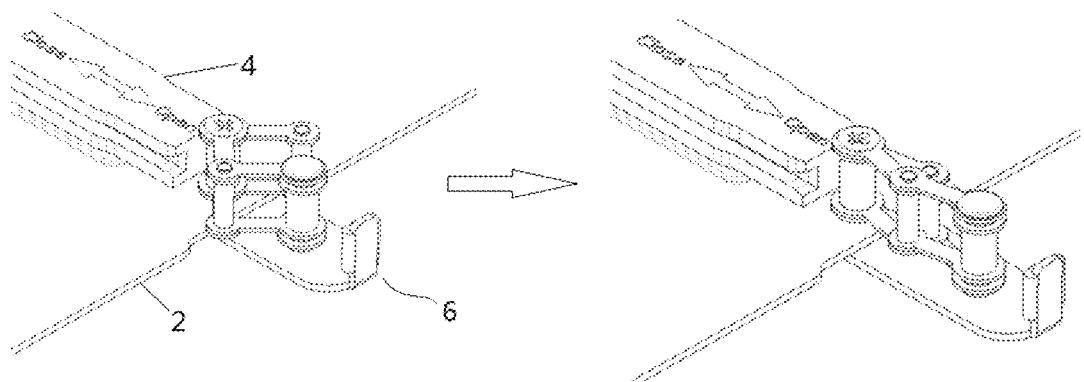
FIG. 6 is a schematic diagram of an unlocking process of a movement locking member.

With reference to FIGS. 1-6, FIG. 1 is a schematic diagram of a tool-free locking mechanism according to an embodiment of the disclosure, FIG. 2 is an enlarged view of a movement locking member in FIG. 1, FIG. 3 is a schematic diagram of a movement locking member in a locked state, FIG. 4 is a partial enlarged view of a guide assembly, FIG. 5 is a schematic diagram of mounting of a module body, and FIG. 6 is a schematic diagram of an unlocking process of a movement locking member.

A tool-free locking mechanism according to the present disclosure is able to simultaneously lock and unlock a plurality of module bodies 1, thereby reducing locking parts, reducing locking cost, and improving mounting efficiency of the module bodies 1 and assembly efficiency of a server.

To this end, an embodiment of the disclosure provides a tool-free locking mechanism. With reference to FIGS. 1 and 5, the tool-free locking mechanism includes a module tray 2, a limiting member and at least one movement locking member 6. A pair of side slideways 3 mounted on a bottom plate of the module tray 2 in parallel and a middle slideway 4 fixed between the pair of side slideways 3 in parallel are used in the limiting member. A group of mounting grooves 5 are formed between the middle slideway 4 and one of the pair of the side slideways 3 on a first side of the middle slideway. Another group of mounting grooves 5 are formed between the middle slideway 4 and the other of the pair of the side slideways 3 on a second side of the middle slideway. The at least one movement locking member 6 is movably connected to the module tray 2, and is located at an outer side of an end portion of the middle slideway 4. The at least one movement locking member 6 is able to move towards/away from the module tray 2. When the at least one movement locking member 6 moves towards the module tray 2 until the at least one movement locking member matches the module tray by a locking structure, the at least one movement locking member 6 is fixed, and the at least one movement locking member 6 abuts against an outer side of the module bodies 1 located in the mounting grooves 5 by a locking portion, thereby fixing the module bodies 1 in the mounting grooves 5.

In some embodiments, as shown in FIGS. 2, 3 and 6, each movement locking member 6 includes a locking bottom plate 60 and a four-link assembly. The locking bottom plate 60 is movably connected to the bottom plate of the module tray 2. The four-link assembly is an openable rhombic link mechanism formed by connecting a fixed shaft 61, a drive shaft 62, two functional shafts 63, two first links 65 and two second links 66. The fixed shaft 61 is fixed to the bottom plate of the module tray 2. The drive shaft 62 is fixed to an upper end surface of the locking bottom plate 60. The two functional shafts 63 are symmetrically connected between two sides of the fixed shaft 61 and the drive shaft 62 by the two first links 65 and the two second links 66. Two ends of the first link 65 are rotatably connected to the fixed shaft 61 and the functional shaft 63 respectively, and two ends of the second link 66 are rotatably connected to the drive shaft 62 and the functional shaft 63 respectively such that the pair of functional shafts 63 are able to be relatively opened and closed. When the locking bottom plate 60 moves towards the module tray 2, the drive shaft 62 moves towards the fixed shaft 61, the pair of functional shafts 63 are opened to match the first link 65 and the second link 66 to form the locking portion, and the locking portion abuts against and limits outer sides of two module bodies 1 mounted in two mounting grooves 5 of the mounting grooves 5 on two sides of the middle slideway 4, so as to synchronously lock and fix the two module bodies 1. When the module bodies 1 need to be unlocked, the locking bottom plate 60 is pulled outwards, the drive shaft 62 is away from the fixed shaft 61, and the pair of functional shafts 63 are attached to each other under a driving effect of the two first links 65 and the two second links 66, such that the module bodies 1 are unlocked.

In the above embodiment, a periphery of each of the two functional shafts 63 is sleeved with a rubber sleeve 64. Front-rear tolerance generated when the module bodies 1 are mounted in the mounting grooves 5 is able to be absorbed through compression deformation of the rubber sleeve 64, thereby ensuring that the module bodies 1 are tightly mounted and fixed. A handle 67 is further arranged above an outer side of the locking bottom plate 60, thereby conveniently driving the locking bottom plate 60 to move.

In some embodiments, a positioning protrusion 69 and a positioning hole 21 are used in a locking structure between the locking bottom plate 60 and the module tray 2, as shown in FIG. 2. The bottom plate of the module tray 2 is provided with the positioning hole 21. An upper surface of the locking bottom plate 60 is provided with the positioning protrusion 69. When a locking portion of the at least one movement locking member 6 is attached to the outer side of the module bodies 1, the positioning protrusion 69 falls into the positioning hole 21, thereby locking the module tray 2 and the locking bottom plate 60 relative to each other. In some embodiments, the positioning protrusion 69 is a truncated cone-shaped protrusion. The locking structure is able to be locked and unlocked by a lateral guidance of the truncated cone-shaped protrusion. Moreover, a second positioning hole may further be provided on the bottom plate of the module tray 2, and the second positioning hole is located at an outer side of the positioning hole 21. A direction of a line connecting the second positioning hole and the positioning hole 21 coincides with a direction of movement of the movement locking member 6. When the locking bottom plate 60 is pulled outwards until the pair of functional shafts 63 are attached to each other, the positioning protrusion 69 falls into the second positioning hole. Understandably, the locking structure is not limited to a structure in which the positioning protrusion 69 and the positioning hole 21 match each other as described in the embodiment.

In an embodiment, a guide assembly is further arranged between the locking bottom plate 60 and the bottom plate of the module tray 2, and the guide assembly has an effect of guidance on movement of the locking bottom plate 60 towards/away from the module tray 2. With reference to FIG. 4, a strip-shaped guide hole 68 provided on the locking bottom plate 60 and a guide bolt 22 fixed on the bottom plate of the module tray 2 may be used in the guide assembly. A length direction of the strip-shaped guide hole 68 coincides with a direction of movement of the locking bottom plate 60. The guide bolt 22 is connected to a guide nut. A size of the guide nut is greater than a width of the strip-shaped guide hole 68 such that the locking bottom plate 60 is able to be effectively prevented from being separated from the module tray 2. Moreover, a guide rail and a guide groove matching each other may further be used in the guide assembly, which is not specifically limited in the disclosure.

Under the teaching of the above embodiment, more than N mounting grooves 5 may also be provided. N may be a positive integer greater than 2. With three mounting grooves 5 as an embodiment, the limiting member may include two side slideways 3 and two middle slideways 4 in this case. The two middle slideways 4 are equidistantly fixed between the pair of side slideways 3 in parallel. A group of mounting grooves 5 are formed between the two middle slideways 4, and two mounting grooves 5 are formed between each of the two middle slideways 4 and the corresponding side slideways 3. Two groups of movement locking members 6 are arranged, and the two groups of movement locking members 6 are provided corresponding to the middle slideways 4 one to one. In order to conveniently and quickly mount and fix the module bodies 1, locking bottom plates 60 of adjacent movement locking members 6 may be fixedly connected into a whole by a connecting plate. All the movement locking members 6 are able to simultaneously lock or unlock the module bodies 1 only by driving one group of locking bottom plates 60.

As shown in FIGS. 5 and 6, a mounting and fixing process of module bodies 1 is as follows: the module bodies 1 are inserted into corresponding mounting grooves 5 in place one by one, then a movement locking member 6 is driven to move towards a module tray 2, functional shafts 63 move away from each other to match first links 65 and second links 66 to form a locking portion, the locking portion abuts against an outer side of the module bodies 1, and a locking bottom plate 60 and a module tray 2 are fixed by a locking structure, such that the movement locking member 6 locks the plurality of module bodies 1.

The disclosure further provides a server. The server includes module bodies 1 and the tool-free locking mechanism described in the above embodiment. The module bodies 1 are specifically an open compute project (OCP) card, and other parts of the server may refer to settings of an existing server, which are not repeated in the disclosure.

Compared with the prior art, in the tool-free locking mechanism according to the disclosure, the plurality of module bodies only need to be mounted into the mounting grooves separately, then the movement locking member is pushed relative to the module tray, and the movement locking member and the module tray are relatively locked through matching of the locking structures between the movement locking member and the module tray. Moreover, when the movement locking member and the module tray are locked relative to each other, the locking portion of the movement locking member abuts against the outer side of the module bodies to lock the plurality of module bodies simultaneously. An unlocking process is reversed to the above. The movement locking member is removed, and the locking portion is separated from the module bodies to unlock the plurality of module bodies synchronously. Compared with one-by-one locking and disassembly of the module bodies, locking components are reduced, and locking cost is reduced. More importantly, locking and disassembly efficiency of the module bodies is significantly improved, thereby improving assembly efficiency of the server.

It should be noted that relational terms in the description, such as first and second are merely used to distinguish one entity from several other entities without necessarily requiring or implying any actual such relation or order between such entities.

The server and the tool-free locking mechanism according to the disclosure are introduced in detail above. Specific embodiments are used for illustrating the principle and embodiments of the disclosure herein. The description of the embodiments above is only used for helping understand the method and core concept of the disclosure. It should be noted that several improvements and modifications may further be made to the disclosure by those of ordinary skill in the art without departing from the principle of the disclosure, which also fall within the scope of protection of the claims of the disclosure.

LIST OF REFERENCE NUMERALS

1—module body
2—module tray
3—side slideway
4—middle slideway
5—mounting groove
6—movement locking member
21—positioning hole
22—guide bolt
60—locking bottom plate
61—fixed shaft
62—drive shaft
63—functional shaft
64—rubber sleeve
65—first link
66—second link
67—handle
68—strip-shaped guide hole
69—positioning protrusion

What is claimed is:

1. A tool-free locking mechanism, wherein the tool-free locking mechanism is configured to mount and fix module bodies, and comprises:

a module tray and a limiting member fixed to the module tray, wherein mounting grooves for insertion of the module bodies are formed in the limiting member, and at least two mounting grooves are provided in parallel; and at least one movement locking member movably connected to the module tray, wherein the at least one movement locking member is provided at an outer side between notches of adjacent mounting grooves of the at least two mounting grooves, the at least one movement locking member comprises a locking portion, and locking structures matching each other are provided between the module tray and an end of the at least one movement locking member close to the module tray; and the locking structures lock the module tray and the movement locking member when the at least one movement locking member moves towards the module tray and the locking portion abuts against outer sides of module bodies in the adjacent mounting grooves;

wherein the at least one movement locking member comprises a locking bottom plate and a four-link assembly, wherein the four-link assembly comprises:
a fixed shaft fixed to the module tray;
a drive shaft fixed to the locking bottom plate;
functional shafts, wherein a pair of functional shafts are arranged and both connected between the fixed shaft and the drive shaft;

at least one first link, wherein two ends of the at least one first link are hinged to the fixed shaft and the functional shafts respectively; and at least one second link, wherein two ends of the at least one second link are hinged to the drive shaft and the functional shafts respectively; and the pair of functional shafts move away from each other to match the at least one first link and the at least one second link to form the locking portion when the locking bottom plate moves towards the module tray to drive the drive shaft to move towards the fixed shaft.

2. The tool-free locking mechanism as claimed in claim 1, wherein each of the functional shafts is sleeved with a rubber sleeve.

3. The tool-free locking mechanism as claimed in claim 1, wherein an end of the locking bottom plate away from the module tray is provided with a handle.

4. The tool-free locking mechanism as claimed in claim 1, wherein the locking structure comprises a positioning protrusion arranged on the locking bottom plate, and a positioning hole provided on the module tray and matching the positioning protrusion.

5. The tool-free locking mechanism as claimed in claim 4, wherein when the locking portion of the at least one movement locking member is attached to the outer side of the module bodies, the positioning protrusion falls into the positioning hole, thereby locking the module tray and the locking bottom plate relative to each other.

6. The tool-free locking mechanism as claimed in claim 4, wherein the positioning protrusion is a truncated cone-shaped protrusion.

7. The tool-free locking mechanism as claimed in claim 4, wherein a second positioning hole may further be provided on the bottom plate of the module tray, and the second positioning hole is located at an outer side of the positioning hole, a direction of a line connecting the second positioning hole and the positioning hole coincides with a direction of movement of the movement locking member.

8. The tool-free locking mechanism as claimed in claim 1, wherein a guide assembly is arranged between the locking bottom plate and the module tray.

9. The tool-free locking mechanism as claimed in claim 8, wherein the guide assembly comprises a strip-shaped guide hole provided on the locking bottom plate, and a guide bolt fixed to the module tray.

10. The tool-free locking mechanism as claimed in claim 9, wherein a length direction of the strip-shaped guide hole coincides with a direction of movement of the locking bottom plate.

11. The tool-free locking mechanism as claimed in claim 9, wherein a size of the guide nut is greater than a width of the strip-shaped guide hole.

12. The tool-free locking mechanism as claimed in claim 8, wherein N mounting grooves are provided, N−1 groups of movement locking members are provided, and the locking bottom plates of adjacent movement locking members are fixedly connected into a whole by a connecting plate, wherein N is a positive integer greater than or equal to 3.

13. The tool-free locking mechanism as claimed in claim 1, wherein the limiting member comprises a pair of side slideways provided parallel to each other, and a middle slideway arranged between the pair of side slideways in parallel, wherein the mounting grooves are formed between the middle slideway and the side slideway, and the at least one movement locking member is provided corresponding to an end portion of the middle slideway.

14. The tool-free locking mechanism as claimed in claim 13, wherein the at least one movement locking member is movably connected to the module tray, and is located at an outer side of an end portion of the middle slideway, the at least one movement locking member is able to move towards/away from the module tray.

15. The tool-free locking mechanism as claimed in claim 1, wherein the four-link assembly is an openable rhombic link mechanism formed by connecting the fixed shaft, the drive shaft, the two functional shafts, two first links and two second links.

16. The tool-free locking mechanism as claimed in claim 15, wherein the fixed shaft is fixed to the bottom plate of the module tray, the drive shaft is fixed to an upper end surface of the locking bottom plate.

17. The tool-free locking mechanism as claimed in claim 1, wherein the limiting member comprises a pair of side slideways provided parallel to each other, and a middle slideway arranged between the pair of side slideways in parallel, wherein the mounting grooves are formed between the middle slideway and the side slideway, and the at least one movement locking member is provided corresponding to an end portion of the middle slideway, when the locking bottom plate moves towards the module tray, the drive shaft moves towards the fixed shaft, the pair of functional shafts are opened to match the first link and the second link to form the locking portion, and the locking portion abuts against and limits outer sides of two module bodies mounted in two mounting grooves of the mounting grooves on two sides of the middle slideway, so as to synchronously lock and fix the two module bodies.

18. The tool-free locking mechanism as claimed in claim 1, wherein when the module bodies need to be unlocked, the locking bottom plate is pulled outwards, the drive shaft is away from the fixed shaft, and the pair of functional shafts are attached to each other under a driving effect of the first link and the second link, such that the module bodies are unlocked.

19. A server, comprising module bodies and the tool-free locking mechanism as claimed in claim 1.

* * * * *